United States Patent
Noë et al.

(10) Patent No.: US 12,437,279 B2
(45) Date of Patent: Oct. 7, 2025

(54) TECHNIQUES FOR PERFORMING AUTHENTICATION IN ECOMMERCE TRANSACTIONS

(71) Applicant: Mastercard International Incorporated, Purchase, NY (US)

(72) Inventors: James Christian Noë, West Wickham (GB); Michael John Cowen, Uffculme (GB); John Tierney, Wirral (GB)

(73) Assignee: Mastercard International Incorporated, Purchase, NY (US)

( * ) Notice: Subject to any disclaimer, the term of this patent is extended or adjusted under 35 U.S.C. 154(b) by 398 days.

(21) Appl. No.: 17/341,516

(22) Filed: Jun. 8, 2021

(65) Prior Publication Data

US 2021/0406849 A1 Dec. 30, 2021

(30) Foreign Application Priority Data

Jun. 30, 2020 (EP) .................................... 20183056

(51) Int. Cl.
*G06Q 20/12* (2012.01)
*G06Q 20/02* (2012.01)
(Continued)

(52) U.S. Cl.
CPC ............ *G06Q 20/12* (2013.01); *G06Q 20/02* (2013.01); *G06Q 20/40975* (2013.01); *G06Q 40/02* (2013.01); *H04L 9/3247* (2013.01)

(58) Field of Classification Search
CPC .. G06Q 20/12; G06Q 20/02; G06Q 20/40975; G06Q 40/02; H04L 9/3247
See application file for complete search history.

(56) References Cited

U.S. PATENT DOCUMENTS 8,313,022 B2 * 11/2012 Hammad ............... G06Q 20/12
235/375
2002/0035548 A1 3/2002 Hogan et al.
(Continued)

FOREIGN PATENT DOCUMENTS

| EP | 3364363 | 8/2018 |
| WO | 2013155627 | 10/2013 |
| WO | 20150160385 | 10/2015 |

OTHER PUBLICATIONS

"How Apple Pay works under the hood?" webpage <https://codeburst.io/how-does-apple-pay-actually-work-f52f7d9348b7>, Nov. 5, 2019, retrieved from Internet Archive Wayback Machine <https://web.archive.org/web/20191112200813/https://codeburst.io/how-does-apple-pay-actually-work-f52f7d9348b7?gi=bb7ffdbba1e2> (Year: 2019) retrieved on Aug. 9, 2023.*
(Continued)

*Primary Examiner* — Ilana L Spar
*Assistant Examiner* — Monica A Mandel
(74) *Attorney, Agent, or Firm* — Hovey Williams LLP

(57) ABSTRACT

The present invention provides a technical solution by which a consumer can be successfully authenticated in the scenario where the payment card or payment token provided by the consumer in an e-commerce/card not present transaction does not correspond to the payment account that is to provide the funds for effecting payment. This technical solution advantageously ensures that authentication security is not compromised whilst also enabling the consumer to enjoy the increased flexibility that comes with funding a transaction using a payment account that is not associated with the payment card/token provided by the consumer. Additionally, the present invention requires relatively little change to the configuration of the computing devices that collectively function to enable the transaction to take place (Continued)

(e.g. payment network computing devices, merchant computing devices, access control servers (ACS)).

15 Claims, 5 Drawing Sheets

(51) Int. Cl.
*G06Q 20/40* (2012.01)
*G06Q 40/02* (2023.01)
*H04L 9/32* (2006.01)

(56) References Cited

U.S. PATENT DOCUMENTS

| | | | |
|---|---|---|---|
| 2004/0050928 A1 | 3/2004 | Bishop et al. | |
| 2005/0102234 A1* | 5/2005 | Devine | G06Q 30/06 705/44 |
| 2006/0178986 A1 | 8/2006 | Giordano et al. | |
| 2009/0048968 A1 | 2/2009 | Bishop et al. | |
| 2010/0036770 A1* | 2/2010 | Fourez | G06Q 20/40 705/41 |
| 2010/0174620 A1 | 7/2010 | Stringfellow et al. | |
| 2010/0258620 A1 | 10/2010 | Torreyson et al. | |
| 2012/0018506 A1* | 1/2012 | Hammad | G06Q 20/385 235/375 |
| 2014/0164254 A1 | 6/2014 | Dimmick | |
| 2014/0372308 A1 | 12/2014 | Sheets | |
| 2015/0046338 A1* | 2/2015 | Laxminarayanan | G06Q 20/38215 705/67 |
| 2015/0046340 A1 | 2/2015 | Dimmick | |
| 2015/0120472 A1 | 4/2015 | Aabye et al. | |
| 2015/0227920 A1 | 8/2015 | Sadiq et al. | |
| 2016/0239833 A1 | 8/2016 | Venugopalan et al. | |
| 2016/0260096 A1 | 9/2016 | Lacoss-Arnold et al. | |
| 2017/0046691 A1* | 2/2017 | Tierney | G06Q 20/385 |
| 2018/0006821 A1 | 1/2018 | Kinagi | |
| 2019/0020478 A1* | 1/2019 | Girish | H04L 9/3231 |
| 2019/0095908 A1 | 3/2019 | Acoss-Arnold et al. | |
| 2019/0108508 A1 | 4/2019 | Parento | |
| 2020/0005287 A1 | 1/2020 | Lopreiato et al. | |
| 2020/0090184 A1 | 3/2020 | Kallugudde et al. | |
| 2020/0160323 A1* | 5/2020 | Ledwell | G06Q 20/42 |
| 2021/0241261 A1* | 8/2021 | Kumar | G06Q 30/06 |

OTHER PUBLICATIONS

European Search Report from European Patent Application No. 20183056.9 entitled Techniques for Performing Authentication in Ecommerce Transactions (Nov. 12, 2020).
PCT Search Report from PCT Patent Application No. PCT/US2021/033134 entitled Techniques for Performing Authentication in Ecommerce Transactions (Jul. 28, 2021).

* cited by examiner

TECHNIQUES FOR PERFORMING AUTHENTICATION IN ECOMMERCE TRANSACTIONS

CROSS REFERENCE TO RELATED APPLICATIONS

This application claims priority to European Application No. 20183056.9, filed Jun. 30, 2020, which is incorporated herein by reference in its entirety.

FIELD OF INVENTION

This invention relates generally to authentication and authorisation, and more particularly to the secure processing of transactions on an electronic commerce platform.

BACKGROUND

In the modern world it is often necessary to provide authentication and/or authorisation in an electronic manner, e.g. to use a particular service, communicate with a particular data processing device or to effect an electronic payment. Typically an electronic authentication process involves supplying some form of electronic authentication credential to evidence that the sender of the electronic credential is who they purport to be. The authentication credential itself and/or the process by which it is generated and supplied is designed such that only the authorised party associated with legitimate use of the credential can obtain and use the credential. This enables the identity of the authorised party to be verified. In the context of electronic payments, for example, the authentication credential can be a cryptogram generated according to the EMV® standard as is known in the art.

The 3-D Secure (3DS) authentication protocol is based on a three-domain model where the Acquirer Domain and the Issuer Domain are connected by the Interoperability Domain for the purpose of authenticating a cardholder during a 'card not present' or 'electronic commerce' (e-commerce) transaction, or to provide identity verification and account confirmation.

There is thus a need for authentication techniques that are particularly suited to circumstances where a cardholder needs to be reliably authenticated during an e-commerce transaction; specifically, in situations where the payment card details being entered into the e-commerce platform are not the same as the details of the payment card selected by the cardholder to actually effect payment.

SUMMARY OF THE INVENTION

In a first aspect, the invention provides a computer-implemented method for authenticating a transaction using a preferred payment card for a consumer which is different to a first card which the consumer has entered details of into an e-commerce platform, comprising: receiving, by a payment network server from a first access control server, ACS, a first message comprising a request to identify the preferred payment card, wherein the first ACS is associated with an issuer of the first card; transmitting, by the payment network server to the first ACS, a second message comprising details of the preferred payment card, the second message for routing to a second ACS for processing, wherein the second ACS is associated with an issuer of the preferred payment card; receiving, by the payment network server from a merchant acquirer server, an authorisation request, wherein the authorisation request includes an authentication response from the second ACS; and transmitting, by the payment network server to the issuer of the preferred payment card, the authorisation request.

In a second aspect, the invention provides a payment network server configured to perform the method of the first aspect.

In a third aspect, the invention provides a system comprising a payment network server and a directory server, the system configured to perform the method of the first aspect.

In a fourth aspect, the invention provides a computer-readable comprising instructions which, when executed by a processor, cause the processor to perform the method of the first aspect.

Broadly speaking, the present invention provides a technical solution by which a consumer can be successfully authenticated in the scenario where the payment card or payment token provided by the consumer in an e-commerce/card not present transaction does not correspond to the payment account that is to provide the funds for effecting payment. This technical solution advantageously ensures that authentication security is not compromised whilst also enabling the consumer to enjoy the increased flexibility that comes with funding a transaction using a payment account that is not associated with the payment card/token provided by the consumer. Additionally, the present invention requires relatively little change to the configuration of the computing devices that collectively function to enable the transaction to take place (e.g. payment network computing devices, merchant computing devices, access control servers (ACS)).

At a high level, in a first embodiment the invention comprises the following. A consumer performs a check out process using a consumer device communicating with a merchant server. The consumer provides details of a main issuer card (either a plastic card or device token) during the checkout process, where the main issuer card is associated with a main issuer. The merchant server calls a directory server with the details of the main issuer's card (first card) and requests authentication. The directory server routes this authentication request to the main issuer's ACS (first ACS). The ACS then calls a payment network server (or uses its own lookups) to establish the currently preferred card for the consumer, where the currently preferred card is associated with the payment account that the user wishes to use to effect payment. If the currently preferred card is not the same as the main issuer card, then a new authentication request is made by the main issuer's ACS to the directory server with the preferred card selected. This new authentication request is then routed by the directory server to the selected issuer's ACS (second ACS) for authentication. Any necessary SCA can also be performed by the second ACS. The resulting response (e.g. an authorisation approved message containing a cryptogram, or authorisation failed message) is passed back along the chain and inserted into an authorisation response message. The directory server is able to link the two calls together so that any SCA process that is necessary can be performed correctly—e.g. information that needs to be displayed in a challenge window in a browser can correspond to the preferred payment card, not the main issuer card.

In a second, alternative embodiment, the main issuer's ACS also acts as a directory server for routing the new authentication request. In this case the main issuer's ACS directly calls the selected issuer's ACS and requests that authentication is performed. The advantage here is that ACS SCA challenges can be passed back via the same route to the consumer's browser if needed, eliminating any latency associated with the message being passed via the directory server.

BRIEF DESCRIPTION OF THE DRAWINGS

Embodiments of the present invention are described below, by way of example only, with reference to the accompanying drawings, in which.

DETAILED DESCRIPTION

Figure 1:
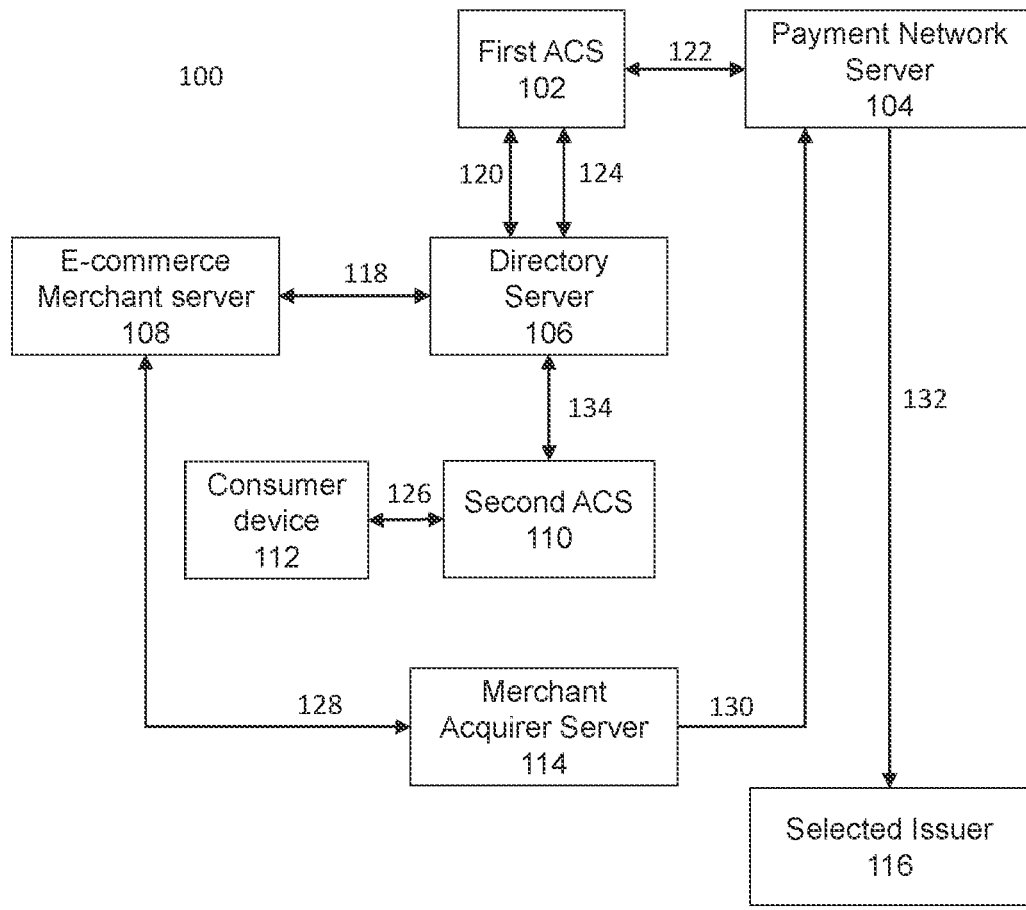
FIG. 1 illustrates in schematic form a system suitable for implementing aspects of the invention.

In the following description aspects of the inventive are at times described in the context of electronic payments. It will be appreciated however that the invention has application in any context outside of electronic payments where authentication of a user is required, particularly where the user is not physically present at the location of the party seeking to authenticate the user. The invention thus should not be limited in this regard.

As used herein, authentication refers to the process by which a user is able to prove that they are who they purport to be. Typically, the user provides something they know (e.g. a PIN or passcode), something they are (e.g. biometric information) or something they have (e.g. a smart card) in order to prove that they are who they purport to be and hence authenticate themselves with a party requesting the authentication. In the case of a cardholder not present/e-commerce transaction, the user cannot provide anything they have because they are not physically present at the location of the requesting party or an agent thereof.

As used herein, the term "3-D Secure" (3DS) means an e-commerce authentication protocol that enables the secure processing of payment, non-payment and account confirmation card transactions. The term "Access Control Server" (ACS) means a component that operates in the Issuer Domain, that verifies whether authentication is available for a card number and device type, and authenticates specific Cardholders. The term "Authentication Request (AReq) Message" means an EMV 3-D Secure message sent by the 3DS Server via the DS to the ACS to initiate the authentication process. The term "Strong Customer Authentication" (SCA) means an authentication based on the use of two or more elements categorised as knowledge (something only the user knows), possession (something only the user possesses) and inherence (something the user is). These must be independent from one another, in that the breach of one does not comprises the reliability of the others, and is designed in such a way as to protect the confidentiality of the authentication data.

3DS can be initiated through three device channels. Firstly, app-based: authentication during a transaction on a consumer device that originates from an app provided by a 3DS requestor (merchant, digital wallet, etc.). For example, an e-commerce transaction originating during a check-out process within a merchant's app. Secondly, browser-based: authentication during a transaction on a consumer device that originates from a website communicating with a browser installed on the consumer device. For example, an e-commerce transaction originating during a check-out process within a website communicating with a consumer device. Finally, 3DS requestor initiated: confirmation of account information and cardholder authentication with no direct cardholder present. For example, a subscription-based e-commerce merchant confirming that an account is still valid or cardholder authentication with the 3DS requester and the ACS utilises decoupled authentication.

The revised Payment Services Directive ('PSD2') is an EU Payments Services Directive which aims to improve consumer rights and enhance online security. PSD2 requires that issuers perform SCA whenever a threshold is reached. Without chip data as supplied during a card present transaction in which the cardholder and merchant (or agent thereof) are co-located, issuers are not able to validate various elements for SCA. Alternative techniques are required to ensure that SCA can nevertheless be performed.

In an existing 3DS flow the consumer goes through a checkout process on a merchant website using their consumer device. The merchant server calls a directory server, which then routes the request to the issuer's ACS. The ACS then determines if SCA is required, and if so performs SCA. This could be in an e-commerce merchant's browser window displayed on the consumer device, out of band (e.g. a push message to a mobile banking app on the consumer's device), or some other mechanism. Whichever technique is used the consumer is required to provide some information that can be used by the ACS to authenticate them, e.g. entering a PIN, password or providing biometric information. Once SCA is complete, the ACS returns a result, e.g. a cryptogram, which is pushed into the authorisation request message. This message then flows through the standard route to the issuer server, who can then validate it with the ACS.

Problems arise with this technique when systems supporting multiple payment mechanisms with one token are used. This occurs where issuers allow multiple funding sources and pre- or post-transaction selection by the consumer of which funding source to use, without any impact on the token, or any associated plastic card. For example, after the consumer has securely logged in to an issuer's app, preferably using SCA, they can select their preferred payment mechanism. The preference can be applied to tokenised transactions as well as the more traditional plastic card-based transactions. The payment network server can store the preferred payment mechanism selected by the consumer in a data store. This enables a user to supply details of a first payment token or first plastic card to a merchant, whilst making use of a payment account not associated with the first payment token or first plastic card to actually effect the payment. The payment account that effects the payment is instead associated with the preferred payment mechanism selected by the consumer.

The first payment token has an associated unique identifier which may be referred to as a device PAN, DPAN. Analogously, the first plastic card has an associated unique identifier which may be referred to as a funding PAN, FPAN. The DPAN (for device-based transactions) or FPAN (for plastic card-based transactions) can be mapped to a unique identifier associated with the preferred payment mechanism, which unique identifier may be referred to as a preferred PAN, PPAN.

As funds are to be supplied from the payment account associated with the PPAN, it is necessary to ensure that the consumer is authorised to effect a payment with this payment account. However, the details supplied by the consumer relate to either the DPAN or FPAN. This mismatch creates a problem for authentication under the existing 3DS flow because the issuer of the first payment token/first plastic card may not be the same as the issuer associated with the payment account that is to provide funds. This means that the ACS associated with the first issuer may not be able to authenticate the consumer. The present invention provides a technical solution to address this issue.

A further problem that arises from this scenario is that PSD2 requires that issuers perform SCA when a number of transactions with a particular payment token/card reaches a threshold or the transaction amount exceeds a specific value. It is difficult to determine whether this threshold or number of transactions has been reached when the payment token/card supplied by the consumer does not correspond to the payment account that is to provide funds. Alternatively, SCA may be enforced for all transactions to support compliance with PSD2. PSD2 must be complied with even in this scenario, and the present invention provides a technical solution to enable this.

FIG. 1 shows a block diagram of a system 100 suitable for implementing embodiments of the invention. System 100 includes a first ACS 102 that is communicatively coupled 122 to a payment network server 104, e.g. via a public network such as the internet, or a private network or virtual private network, or combination thereof. The first ACS 102 is also communicatively coupled 120 to a directory server 106. The directory server 106 is further communicatively coupled 134 to a second ACS 110, which itself communicates 126 with a consumer device 112 (e.g. a smartphone, laptop, desktop computer, wearable, etc.). A user of the consumer device 112 is a consumer. The directory server 106 is further communicatively coupled 118 to an e-commerce merchant server 108. The e-commerce merchant server 108 is communicatively coupled 128 to a merchant acquirer server 114, which communicates 130 with the payment network server 104. The payment network server 104 further communicates 132 with a server of a selected issuer 116.

Figure 2:
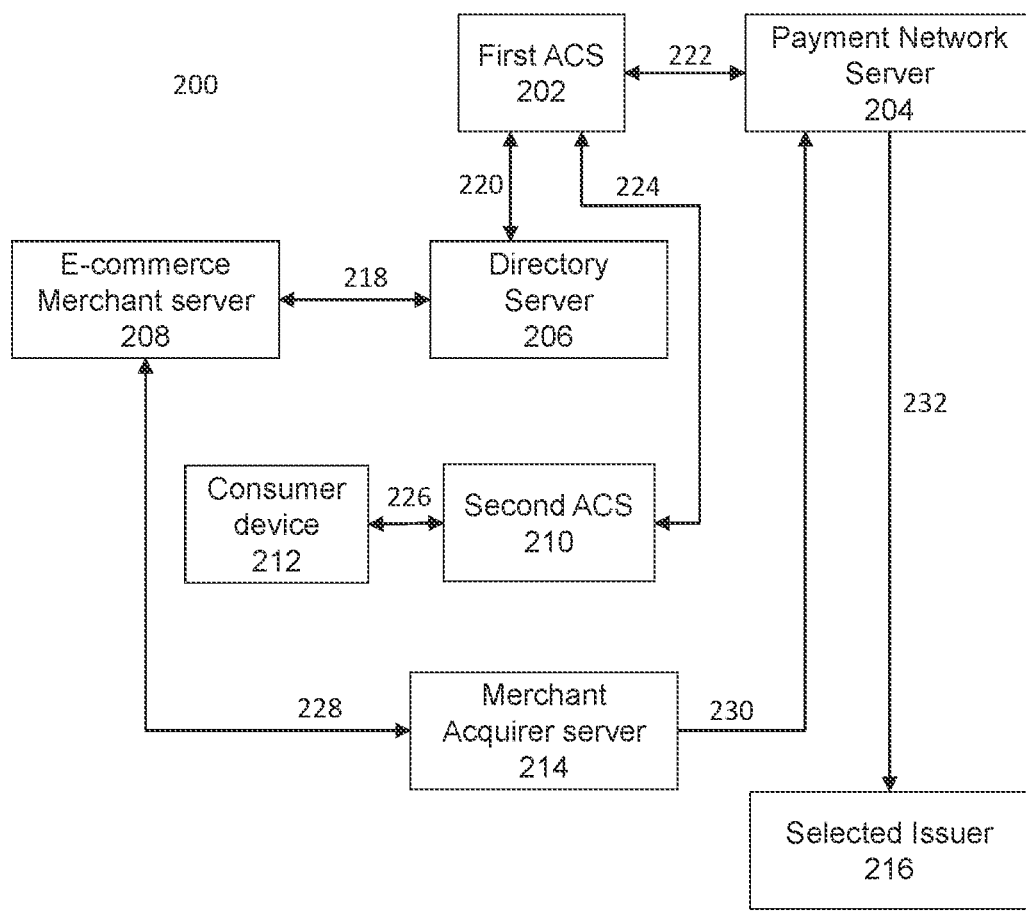
FIG. 2 illustrates in schematic form a system suitable for implementing aspects of the invention.

FIG. 2 shows a block diagram of a system 200 suitable for implementing embodiments of the invention. System 200 includes a first ACS 202 that is communicatively coupled 222 to a payment network server 204, e.g. via a public network such as the internet, or a private network or virtual private network, or combination thereof. The first ACS 202 is also communicatively coupled 220 to a directory server 206 and a second ACS 210. The second ACS 210 further communicates 226 with the consumer device 212. A user of the consumer device 212 is a consumer. The directory server 206 is further communicatively coupled 218 to the e-commerce merchant server 208. The e-commerce merchant server 208 is communicatively coupled 228 to the merchant acquirer server 214, which communicates 230 with the payment network server 204. The payment network server 204 further communicates 232 with a server of a selected issuer 216.

In FIG. 1, directory server 106 plays the role of intermediary between the first ACS 102 and second ACS 110. In FIG. 2, first ACS 202 incorporates at least some directory server functionality such that direct communication 224 between the first ACS 202 and second ACS 210 is possible. This can reduce latency associated with processing of transactions, as fewer network hops may be needed to communicate between the first ACS and second ACS in this configuration when compared with the configuration of FIG. 1.

It will be appreciated that whilst only one e-commerce merchant 108, 208 is shown in FIG. 1 and FIG. 2, it is not necessary for the consumer to make use of the same e-commerce merchant server 108, 208 for each transaction. A user of a consumer device 112, 212 is the consumer. In some cases the consumer is a legal person, e.g. a service-providing corporation, rather than a natural person; in such cases, e-commerce merchant server 108, 208 can be a computer operated by, or on behalf of, the corporation. The consumer can be the corporation themselves, e.g. a merchant providing a good or service.

It will be appreciated that whilst only one second ACS 110, 210 is shown in FIG. 1 and FIG. 2, it is not necessary for the consumer to make use of the same pre-selected card, and hence same second ACS 110, 210, for each transaction authentication.

Figure 3:
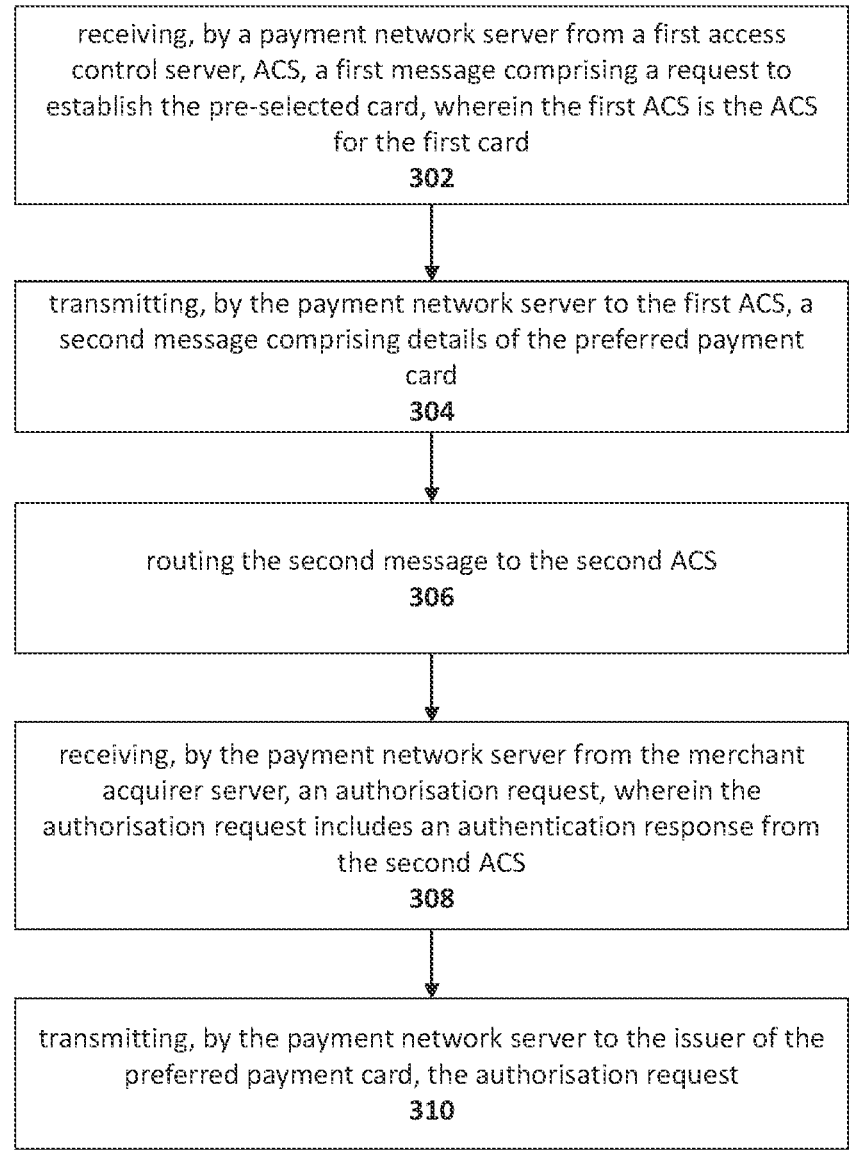
FIG. 3 is a flow diagram setting out the method performed by a payment network according to an embodiment.

FIG. 3 sets out a method for processing a transaction using a pre-selected card for a consumer which is different to a first card which the consumer has entered details of into an e-commerce platform according to an embodiment. The method of FIG. 3 can be performed by payment network server 104, 204. The method of FIG. 3 takes place when the consumer has pre-selected a card which is different to a first card which the consumer has entered details of into an e-commerce platform. The pre-selected card is referred to as a preferred payment card.

In step 302, the payment network server 104, 204 receives 122, 222 a first message from a first ACS 102, 202. The first ACS 102, 202 is the ACS for the first card. This first message may be generated in response to the first ACS receiving an authentication request in relation to the first card. As the first ACS is not associated with an issuer of the first card, it cannot perform the necessary authentication. The first message comprises a request to establish the identity of the preferred payment card and includes details of the first card. The details of the first card in the first message may be, for example, a funding primary account number, FPAN, corresponding to the first card, or equivalently a device primary account number, DPAN, corresponding to the first card. This first message is sent to the payment network server 104, 204 in order to obtain details of the preferred payment card, so as to determine which ACS an authentication request (and any other relevant messages) should be directed to.

In step 304, the payment network server 104, 204 transmits 122, 222 a second message comprising details of the preferred payment card to the first ACS 102, 202. The second message can also comprise a preferred primary account number, PPAN, which is associated with the preferred payment card. The payment network server 104, 204 can obtain the contents of the second message, e.g. the PPAN, by performing a lookup operation using details of the first card as provided in the first message. For example, the payment network server 104, 204 may perform a lookup operation using a FPAN or DPAN to identify a corresponding PPAN stored in a record in a data store accessible by the payment network server 104, 204.

The second message can be a clone of the first message but with details of the preferred payment card replacing details of the first card. For example, the FPAN or DPAN may be replaced with the PPAN. This information enables the first ACS 102, 202 to route the authentication request onwards to the second ACS. Here, the second ACS is an ACS of an issuer corresponding to the PPAN. The second ACS is capable of performing an authentication process to be performed based on the PPAN, whereas the first ACS is not capable of performing this authentication process.

In step 306, the first ACS 102, 202 receives the second message and routes it to the second ACS 110, 210 for authentication processing. The second ACS 110, 210 is the ACS associated with the issuer for the preferred payment card.

The routing 224 of the authentication request to the second ACS 210 can be just via the first ACS 202, with the first ACS 202 acting as a directory server (FIG. 2). The authentication request is therefore sent from the payment network server 204, to the first ACS 202, and then to directly to the second ACS 210. This enables SCA challenges to be passed back via the same route if needed, eliminating latency associated with the directory server 206 acting as an intermediary.

Alternatively, the routing of the authentication request to the second ACS 110 can be via the directory server 106 (FIG. 1). The authentication request is therefore sent from the payment network server 104, to the first ACS 102, to the directory server 106, and on to the second ACS 110 (path 122, 124, 134 in FIG. 1). This enables the directory server 106 to direct the request to the correct ACS for the preferred payment card.

In step 308, the payment network server 104, 204 receives 130, 230 an authorisation request sent from the e-commerce merchant 108, 208 via 128 the merchant acquirer server 114, 214. An authentication response is sent from the second ACS 110, 210 to the e-commerce merchant server 108, 208 optionally via the first ACS and the directory server 106, 206 in the case where the first ACS communicates directly with the second ACS or alternatively just via the directory server 106, 206, where it is included in the authorisation request sent to the payment network server 104, 204.

If the second ACS 110, 210 determines that additional information needs to be supplied in order to authenticate the consumer, e.g. a step-up challenge is to be performed, the second ACS 110, 210 can contact the consumer device to obtain this information. For example, a rule may require that transactions over a certain amount require the consumer to authenticate. In addition or alternatively, a rule may require that after N transactions have been performed with a given payment card without any step up authentication, the N+1$^{th}$ transaction must involve a step up authentication process in which additional information is obtained from the consumer. Alternatively, authentication may be systematically required. Advantageously, the second ACS 110, 210 or payment network server 104, 204 can keep a count of the number of transactions performed by the preferred payment card, so that this rule can be adhered to correctly. It will be appreciated that this is made possible by the actions of payment network server 104, 204, which effectively acts to switch out details of the first payment card with the preferred payment card. It will also be appreciated that any other relevant metric associated with the preferred payment card, e.g. a total spend over a time period or a time between adjacent transactions, can be accurately tracked and acted upon where necessary. This ensures that a high level of security is maintained.

In step 310 the payment network server 104, 204 transmits the authorisation request to the issuer of the preferred payment card (the selected issuer 116, 216), so that the issuer of the card to be used for the transaction can validate the authentication data.

When a step up challenge has been performed, the consumer's response to this challenge or information derived therefrom can be inserted into the authorisation request, if desired, so it can be transmitted to the e-commerce merchant server 108, 208 at the same time.

The authentication response can include a cryptogram. The cryptogram can result from the second ACS 110, 210 and the consumer performing an SCA process. It will be appreciated that the cryptogram generated is associated with the preferred payment card, ensuring consistency within the transaction.

Any data sent to and from the e-commerce merchant server 108, 208 can be sent via the merchant's acquirer server 114, 214. The authorisation response can be transmitted to the e-commerce merchant 108, 208 as a standalone message. Alternatively, the authorisation response can be transmitted with an authentication response, wherein the authentication response is inserted into the authorisation response or is sent simultaneously.

Figure 4:
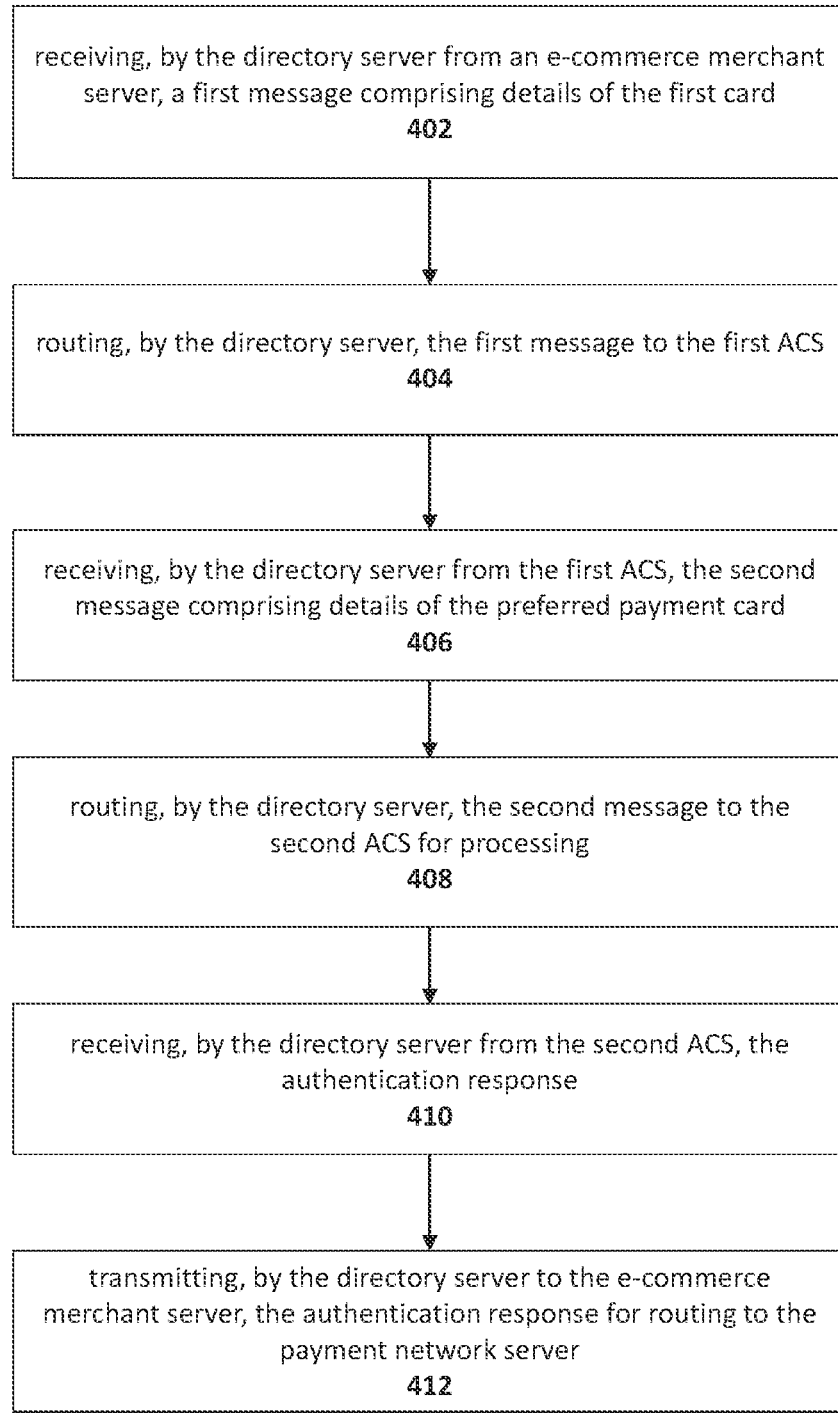
FIG. 4 is a flow diagram setting out further optional steps of the method of FIG. 3, performed by a directory server, according to an embodiment.

FIG. 4 illustrates additional optional steps of the method of FIG. 3, wherein the steps can be carried out in parallel with the steps of FIG. 3. The method of FIG. 4 is a directory service implemented by the directory server 106, 206. The directory service may facilitate some or all of the actions of the directory server disclosed in connection with FIG. 3.

In step 402, the directory server 106, 206 receives 118, 218 the first message from the e-commerce merchant server 108, 208. The first message comprises details of the first card. The e-commerce merchant server 108, 208 can receive the details of the first card by the consumer entering them into an e-commerce platform. These details are forwarded on to the directory server for routing to the appropriate ACS; in this case, the ACS for the first card.

In step 404, the directory server 106, 206 routes 120 the first message to the first ACS 102, 202. This enables the first message to be subsequently received by the payment network sever 104, 204 from the first ACS 102, 202, as set out above in step 302. The first message comprises a request to identify the preferred payment card. The message is sent to the payment network server 104, 204 so that the first ACS can determine the identity of preferred payment card, to enable the second ACS to be identified for subsequent routing of the authentication request and any other related messages.

In the embodiment of FIG. 1, the method of FIG. 4 further comprises the following steps.

In step 406, the directory server 106 receives 120 the second message comprising details of the preferred payment card from the first ACS 102. The second message originates from the payment network and is transmitted to the first ACS 102, 202, as in step 304 described above.

In step 408, the directory server 106 routes 134 the second message to the second ACS 110 for processing as described above in connection with step 306.

In step 410, the directory server 106 receives 134 the authentication response from the second ACS 110, which authentication response is responsive to the second message.

In step 412, the directory server 106 transmits 124 the authentication response to the E-commerce merchant server 108, 208. The authentication response is routed to the payment network server 104, 204 as part of the authorisation response from the e-commerce merchant, as set out in step 310.

The invention thus provides methods and systems that are capable of ensuring that authentication can be performed correctly in the case where payment card details provided to a merchant platform by a consumer are not associated with a payment account that is actually going to fund the transaction.

Figure 5:
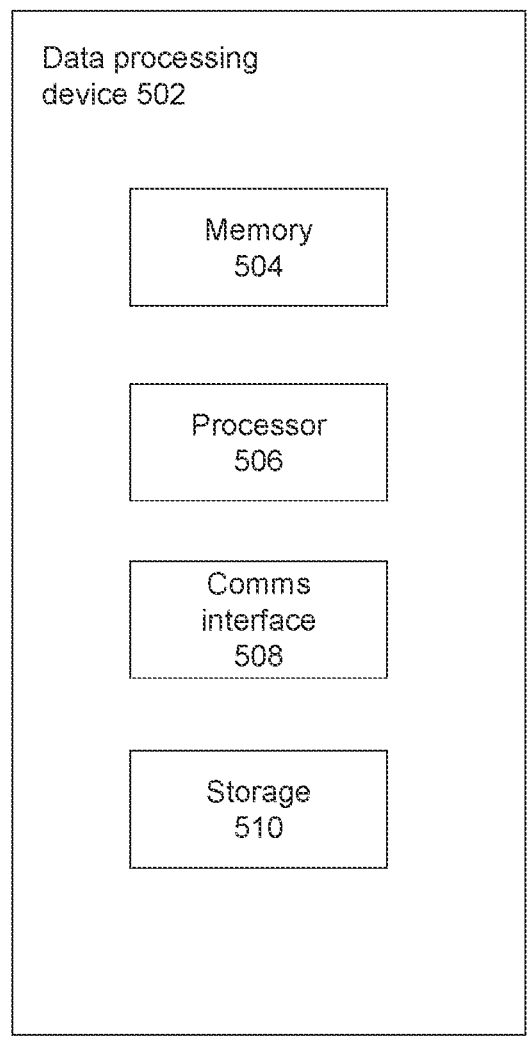
FIG. 5 shows in schematic form a data processing device that is suitable for performing the functions of the payment network server or directory server within the system shown in FIG. 1 and FIG. 2.

It will be apparent to a person skilled in the art that the methods described herein are all suitable for implementation by a data processing device. By way of example, FIG. 5 shows in schematic form a data processing device 502 that is suitable for performing the functions of the payment network server or the directory server.

Data processing device 502 includes a processor 506 for executing instructions. Instructions may be stored in a memory 504, for example. Processor 506 may include one or more processing units (e.g., in a multi-core configuration) for executing instructions. The instructions may be executed within a variety of different operating systems on the data processing device 502, such as UNIX, LINUX, Microsoft Windows®, etc.

Processor 506 is operatively coupled to a communication interface 508 such that data processing device 502 is capable of communicating with a remote device.

Processor 506 may also be operatively coupled to a storage device such as storage medium via storage interface 510. The storage device is any computer-operated hardware suitable for storing and/or retrieving data. In some cases, e.g. a remotely located storage medium, communication interface 508 may perform the function of storage interface 510 such that these two entities are combined.

The storage medium can be integrated in data processing device 502, or it can be external to data processing device 502 and located remotely. For example, data processing device 502 may include one or more hard disk drives as a storage device. Alternatively, where the storage device is external to data processing device 502, it can comprise multiple storage units such as hard disks or solid state disks in a redundant array of inexpensive disks (RAID) configuration. The storage device may include a storage area network (SAN) and/or a network attached storage (NAS) system.

Processor 506 can be operatively coupled to the storage device via a storage interface 510. Storage interface 510 is any component capable of providing processor 506 with access to the storage device. Storage interface 510 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 506 with access to the storage device.

Memory 504 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is enabling sensitive data such a cryptogram to be distributed among secondary merchant data processing devices in a secure manner. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

The invention claimed is:

1. A computer-implemented method for authenticating a transaction using a preferred payment card for a consumer which is different to a first card which the consumer has entered details of into an e-commerce platform, comprising:

receiving, by a payment network server from a first access control server, ACS, a first message comprising a request to identify the preferred payment card, the request including details of the first card, wherein the first ACS is associated with an issuer of the first card, the first card is associated with a first payment account, and the preferred payment card is associated with a preferred payment account that is different than the first payment account;

performing a lookup operation, by the payment network server, using the details of the first card;

identifying, by the payment network server from the lookup operation, details of the preferred payment card;

transmitting, by the payment network server to the first ACS, a second message comprising details of the preferred payment card;

transmitting, by the first ACS, the second message directly to a second ACS for processing, wherein the second ACS is associated with an issuer of the preferred payment card;

receiving, by the payment network server from a merchant acquirer server, an authorisation request, wherein the authorisation request includes an authentication response from the second ACS; and transmitting, by the payment network server to the issuer of the preferred payment card, the authorisation request.

2. The computer-implemented method of claim 1, wherein the authentication response from the second ACS further includes a step up authentication response in the case where the second ACS has determined that step up authentication is required.

3. The computer-implemented method of claim 2, wherein the authentication response comprises a cryptogram.

4. The computer-implemented method of claim 3, wherein the cryptogram results from the second ACS and the consumer performing any strong customer authentication, SCA.

5. The computer-implemented method of claim 4, wherein the second message further comprises a preferred primary account number, PPAN.

6. The computer-implemented method of claim 5, wherein the second message further comprises a preferred primary account number, PPAN, further comprising:
   extracting, by the payment network server, the FPAN or DPAN from the first message; and
   obtaining, by the payment network server, a corresponding PPAN by performing a lookup operation using the FPAN or DPAN.

7. The computer-implemented method of claim 4, further comprising:
   implementing, by a directory server, a directory service comprising:
      receiving, by the directory server from an e-commerce merchant server, the first message; and
      routing, by the directory server, the first message to the first ACS.

8. The computer-implemented method of claim 2, further comprising:
   inserting the authentication response into an authorisation response.

9. The computer-implemented method of claim 8, wherein the authentication response comprises a cryptogram.

10. The computer-implemented method of claim 9, wherein the cryptogram results from the second ACS and the consumer performing any strong customer authentication, SCA.

11. The computer-implemented method of claim 1, further comprising:
   inserting the authentication response into an authorisation response.

12. The computer-implemented method of claim 1, wherein the first message further comprises a funding primary account number, FPAN or a device primary account number, DPAN.

13. The computer-implemented method of claim 1, wherein the second message further comprises a preferred primary account number, PPAN.

14. The computer-implemented method of claim 13, wherein the second message further comprises a preferred primary account number, PPAN, further comprising:
   extracting, by the payment network server, the FPAN or DPAN from the first message; and
   obtaining, by the payment network server, a corresponding PPAN by performing a lookup operation using the FPAN or DPAN.

15. The computer-implemented method of claim 1, further comprising:
   implementing, by a directory server, a directory service comprising:
      receiving, by the directory server from an e-commerce merchant server, the first message; and
      routing, by the directory server, the first message to the first ACS.

* * * * *